(No Model.)
J. DUFF.
METHOD OF AND APPARATUS FOR MANUFACTURING STARCH, DEXTRINE, GLUCOSE, SIRUP, GRAPE SUGAR OR SPIRITS, BEER AND VINEGAR.
No. 270,894. Patented Jan. 23, 1883.
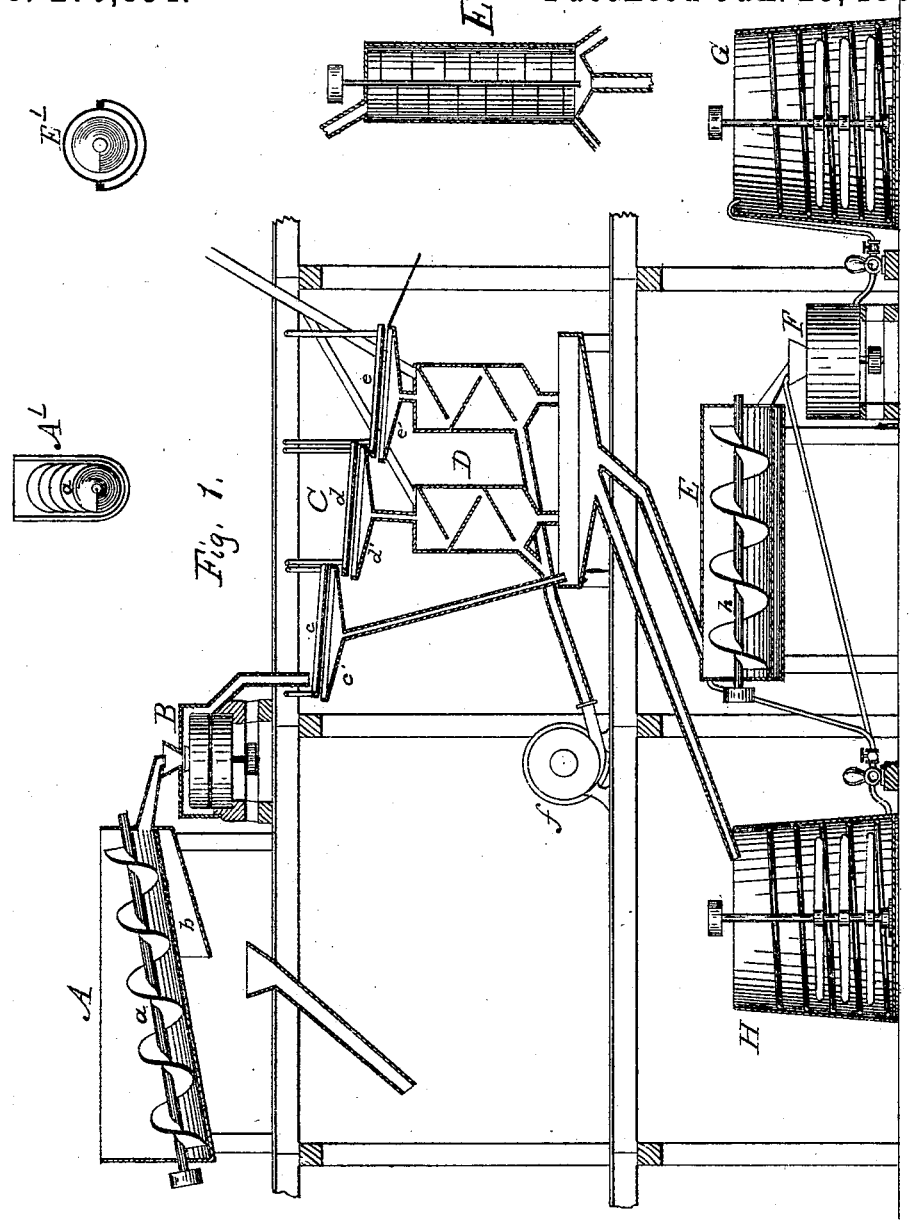
INVENTOR
James Duff
By C. H. Smith atty.
WITNESSES
Geo. F. Hine.
T. D. Brewster

UNITED STATES PATENT OFFICE.

JAMES DUFF, OF OSWEGO, NEW YORK.

METHOD OF AND APPARATUS FOR MANUFACTURING STARCH, DEXTRINE, GLUCOSE, SIRUP, GRAPE-SUGAR, OR SPIRITS, BEER, AND VINEGAR.

SPECIFICATION forming part of Letters Patent No. 270,894, dated January 23, 1883.

Application filed February 27, 1882. (No model.)

*To all whom it may concern:*

Be it known that I, JAMES DUFF, of Oswego, in the county of Oswego and State of New York, have invented certain new and useful Improvements in Methods of and Apparatus for Manufacturing Starch, Dextrine, Glucose, Sirup, Grape-Sugar, or Spirits, Beer, and Vinegar from Grain; and I do hereby declare that the following is a full, clear, and exact description of the invention, which will enable others skilled in the art to which it appertains to make and use the same, reference being had to the accompanying drawings, in which—

Figure I is a perspective and partially sectional view of the whole apparatus; Fig. A', a section of dampener A; Fig. E', a section of cooker E; Fig. E², an upright section of substitute-cooker, which may be used in place of cooker E.

The object of my invention is to more readily and thoroughly remove the hulls and tips of germ of the Indian corn and increase the yield of starch, dextrine, glucose, sirup, and grape-sugar, or spirits, beer, or vinegar, and reduce the time required and the cost of the product.

The corn is first dampened by immersion for a short time, or by sprinkling, using either warm or cold water, or by the application of steam, or by other means or appliances, until the hull is pretty thoroughly moistened, while the body itself of the grain is very little, if any, affected by the moisture. A convenient device for so dampening the corn by the use of either warm or cold water consists of a round-bottom trough conveyer, A, without any lining, within which an ordinary screw conveyer-shaft, $a$, is placed, and mounted in any usual way, so as to permit it to be revolved. This trough is so mounted that the discharge end is higher than the end into which the corn is fed. For about one-half of the length of the trough the lower part of the bottom, from the feed end upward, is made tight, while above that the remainder of the bottom is finely perforated. Beneath the perforated portion a trough, $b$, is placed. When this device is used the corn and water are fed simultaneously into the lower end of the conveyer A. By any ordinary means, and by the revolution of the screw $a$, the corn immersed in the water is gradually worked along upward until when it reaches the perforated portion it has practically left the water, and the greater portion of the accompanying water escapes through the first perforations reached, and only the water which adheres to and is sustained by the kernels in the crevices between them is carried with the corn any considerable distance upward over the perforations, and the corn and adhering water, as they pass upward, are, by the stirring action of the screw $a$, more and more thoroughly separated until when the corn leaves the upper end of the conveyer only a very trifling amount of water accompanies it. Thus the conveyer A operates first to dampen the hulls of the corn and then to drain off nearly, if not all, of the water, so that the corn, when it leaves the conveyer, has its hulls dampened quite thoroughly, while the body of the kernel beneath the hull is quite dry. The water used may be either warm or cold. The length of the tight portion of the bottom of the conveyer, the amount of water used, and the speed of the conveyer-shaft together govern the length of time required to dampen the hulls, as above described, and they are all to be graded in their relation to each other to accomplish this result. The dampening of the hulls renders them pliable, and at the same time toughens them and causes them to readily cleave from the body of the kernel in the subsequent grinding. This dampener prepares the corn for the first grinding. When the corn leaves the conveyer A, in the state and condition described, it is without any delay passed or spouted directly into and is ground moderately high in an ordinary mill, B, in which the stones are somewhat coarsed dressed so that the meal as it leaves the mill is moderately coarse ground. The action of the millstones upon the dampened hulls of the corn is to tear them off in large pieces, carrying with them the tips of germ, and the pieces of hull are not much, if any, ground up by the action of the stones, while the meal is well ground. The pieces of hull are also somewhat dried by the heat of the grinding, and do not pick up the particles of meal to any extent, very little, if any, of it adhering to them. The meal—that is to say, the whole product of the grinding as it leaves the stone—is immediately passed into or upon a series of sieves, C, of varying size of mesh, without any accompanying water or sprinkling, and in its practically dry condition is sifted. The sieves are agitated or rotated in the usual way.

I will describe the operation of sieves of three grades or sizes of mesh, although more or less in number may be used, or a single flat or cylindrical sieve divided into spaces into which the mesh varies in size. The first sieve, $c$, is the one of the finest mesh and is nearest the mill. This sieve takes out the finest particles of meal, and what passes through it is sufficiently free from hulls and tips of germ. The second sieve, $d$, passes the next size of particles of body and the smaller pieces of hull. The third sieve, $e$, passes the remaining particles of meal and some of the hulls and germ, retaining only hulls and tips of germ too large to pass the sieves. Separate boxes are provided, usually one for each sieve—$c'$ for sieve $c$, $d'$ for sieve $d$, and $e'$ for sieve $e$—to receive what passes each sieve and keep them separate. The number of boxes can be varied, such as using one for sieve $c$ and one for sieves $d$ and $e$. This divides the meal into three grades of fineness and purity. What is sifted into the second box, $d'$, passes directly from it into the top of an upright box or tube, D. This box is constructed of any length and size desired, usually rectangular in shape, and has a series of inclined shelves in it on opposite sides, so arranged and adjusted relatively to each other that the meal passing down through the box falls from one shelf upon another until it reaches the bottom. During all of the time of its transit, slipping and raining from one shelf to another, it is exposed to a counter current or blast of air from the fan $f$, graded in strength so that it will blow out the pieces of hull and not any, or very little, of the meal. This purifies the contents of the second box. The contents of the third box, $e'$, are simultaneously with the contents of box $d'$ immediately purified in another tube of like construction with D, but using a stronger blast of air from the fan, as the particles of hull, &c., are larger. Then all the meal which has passed through the sieves and been freed from hulls, &c., as above described, is brought together and fed into a horizontal or slightly-inclined steam-jacketed tubular cooker E, at its upper end. Within this cooker is a screw conveyer-shaft, $h$, extending from one end to the other, and so mounted in bearings as to be revolved. Water, either warm or cold, is fed into the cooker with the meal, and the meal is soaked thereby while it is being subjected to the warming influence of the steam let into the space between the shells of the cooker. Steam may also be let into the interior of the cooker, and so brought into direct contact with the meal, either by having the shaft $h$ hollow and perforated at intervals, or by any other ordinary means. In such case the ends of the cooker should be provided with valve arrangements and devices which will cause the meal to enter or be forced in and the meal and water to escape, and the cooking to be done under pressure, the water-pipe being tapped into the end or side of the cooker at the receiving end. The cooker may be made with the lower half of it jacketed, and the upper part not jacketed and made in a separate piece of such size as to fit upon the lower half, and provided with suitable appliances to make the joints steam-tight, if desired. When so constructed the cooker can be readily cleaned by simply taking off the upper part. The amount of water used is restricted to just enough to cause the meal to be well soaked and saturated, and to cause it to pass freely through and out of the cooker. The cooker should be of good length, and the water and meal pass through it somewhat slowly, a proper speed being given to the screw-shaft in order to insure the meal being thoroughly permeated and softened by the soaking and heating in and by the water. An upright tubular jacketed cooker, $E^2$, can be used, having a central upright shaft, bearing arms or stirrers, and the meal and water fed in together at the top and pass out at the lower end through an outlet-pipe. In either case a tank may be used, in which the meal may receive a preparatory mixing and soaking in water, and pass from thence into the cooker. The water, when fed into the cooker simultaneously with the meal, may be at the boiling-point, or any temperature below that, and the mass in the cooker heated to any extent desired. From the cooker E the mass of meal and water is passed or fed direct into a burr-mill of finer dress. Water can be added during this regrinding, if necessary, but too much should not be used, as it would create too much of a flow or current between the stones and carry off the meal, or some portion of it, before it is thoroughly pulverized. This secondary grinding of the mass is made while it is still heated, if heated at all, and prepares it for the mash-tub in distilling, and for the converting-tub in the dextrine and glucose processes. The mass of pulverized meal and water is then passed into a converting-tub, G, of ordinary construction, where it may be cooked and treated in the usual manner with a converting agent. The mass in the tub G may be converted into dextrine and then filtered, if desired. This produces a filtered solution of dextrine or starch in its first step in transformation, which may then be heated and converted into glucose, sirup, and grape-sugar, or by fermentation and distillation into spirits, beer, and vinegar; or the solution may be concentrated or dried, or partially dried, and the commercial dextrine obtained therefrom. While the mass is being converted tests can be applied for the purpose of determining the progress of the conversion, and when it is completed and the starch fully converted into dextrine or saccharine matter. In the conversion malt may be used at first, and the process completed with malt or diastase or other converting agent. All of the malt may be added at once, or part of it before and part of it after the filtration. Meal, after being divested of hull and then well soaked in the cooker E with moderately-warm water, may be ground with water, and then caustic alkali or other chemical agents be applied and the starch separated in the usual way.

In making starch, the meal, after it has passed through the sieves C and upright air-blast separator-boxes D, may be conducted into tanks, and there mixed with water and chemical agents, and agitated occasionally for a sufficient time to perfect the dissolution of the gluten, oil, &c. After this is perfected the mass may be allowed to stand in the tanks and settle, and after settling the top liquor drawn off, and that part left in the tanks passed into the mill F and reduced, or the whole mass, without settling, passed into the mill and reduced, and then the starch separated in the usual way. After the meal has been treated with alkali or other chemical agents for the purpose of acting upon the gluten, oil, &c., and the mass subsequently ground or reduced, either the whole of the starch may be separated, or a portion can be separated and the balance cooked, reground, and partially converted, then filtered, and then the conversion completed, and then treated in the usual manner; or the conversion of the reground mass may be completed at first, and then filtered and treated as is customary for the production of glucose, sirup, grape-sugar, &c. Dry meal, as ordinarily ground, may be passed direct from the mill B or from a storage-bin into a receiving-tub and mixed and soaked with water, either warm or cold, then passed into the conveyer or cooker E and through it, then reground and passed on or into a separator to remove the remaining pieces of hull, &c., being there thoroughly sprinkled or washed with water, and the starch-liquor so produced treated in the customary manner to produce starch or for conversion into dextrine, glucose, &c.; or a portion of the starch separated, and the balance treated as above described. Meal from other grains as well as corn may be used, except that with other grain they, if ground, should be ground dry and the meal passed direct into the cooker E or into the soaking-tub H and then into the cooker E, and the mixing of the meal from other grains with cornmeal, if desired, can be made at any time in any ordinary manner before it is fed into the cooker E or receiving-tub H. If that be used, or corn alone, or mixed with other grains, can be soaked and cooked in my cooker, and after such cooking be ground, or the grain can be mixed with cornmeal and then soaked or soaked and cooked and then reground, as above described. If desired, the hulls, &c., can be removed from the sieves d and e by an upward blast of air through each sieve, to prevent the passage of particles of hull with the meal, by devices and appliances similar to those used in the middlings-purifying process and apparatus and similarly arranged and operated. As fast as the meal leaves the receiving-box c' and the separators D it can be passed into a mixing-tub, H, simultaneously with water, and there mixed with it to give the meal a preliminary soaking, and from which the mass passes immediately, as fast as mixed, through an outlet in the tub into the cooker E, and from thence into the mill F, and from that into the mash-tub G, as above described; or the meal may be fed into the tub H with heated water, and be there mixed and cooked or heated and pass in continuous movement from thence, either without cooling off or after cooling, direct into the mill F and reground and conducted into the mash-tub G. In this case the steam-jacketed cooker E could be dispensed with. The mixing-tub H is provided with pipes for heating by steam or cooling down by water forced through them, and with a rake of ordinary construction for agitating the mass, and the mash-tub G also.

What I claim as my invention, and desire to secure by Letters Patent, is—

1. The method, substantially as herein described, of treating grain for the purpose of obtaining starch, dextrine, glucose, sirup, and grape-sugar, or spirits, beer, and vinegar, which method consists of the following continuous steps in combination: first, dampening the hulls of the corn without materially wetting the body of the kernel and draining without drying the corn or removing the hulls; second, then immediately grinding the corn so prepared moderately high without any water; third, then removing the hulls, &c., from the meal by sieves and upright air-blast separators, or either; fourth, then mixing and soaking or mixing and cooking the meal with water while in continuous movement through a cooker; fifth, then regrinding the mass as fast as it leaves the cooker; sixth, then passing the reground mass into a tub for treatment or conversion.

2. The process, substantially as herein described, of producing starch, either for commercial purposes or for subsequent saccharification, &c., from dry or practically dry meal by continuous movement of the mass through the sieve, hull-separator, water soaker and mixer, and second mill into the tub for treatment or for conversion.

3. In the manufacture of starch, dextrine, &c., the process, substantially as herein described, of preparing the corn for immediate grinding by dampening the hulls without materially affecting the interior of the kernel and draining it without drying or removing the hulls before grinding.

4. In the process of manufacturing starch for commercial purposes or for conversion into dextrine or saccharine matter, the soaking of corn or of meal while in continuous or practically continuous movement.

5. The corn-dampener A, consisting of a round-bottom trough having the lower part of its bottom tight and the balance perforated, and with a screw-conveyer, a, mounted within it, and provided with a drip-catcher, b, under the perforated part of the bottom, when constructed and operated substantially as and for the purposes specified.

6. The combination of the dampener A, having the lower part of its bottom tight and the balance perforated, with the grinding-mill B, when constructed and operating together substantially as and for the purposes set forth.

7. The combination of the dampener A, having the lower part of its bottom tight and the balance perforated, and grinding-mill B, with the sieve C and separator D, when constructed and operating together substantially as and for the purposes set forth.

8. The combination of the dampener A, grinding-mill B, sieve C, and separator D with the mixer or cooker E, when constructed and operating together substantially as and for the purposes set forth.

9. The combination of the dampener A, grinding-mill B, sieve C, and separator D, and mixer or cooker E with the regrinding-mill F, when constructed and operating together substantially as and for the purposes set forth.

10. The combination of the dampener A, grinding-mill B, sieve C, separator D, cooker E, secondary mill F, and converting or mash tub G, when constructed and operating together substantially as and for the purposes set forth.

11. The combination of the dampener A, grinding-mill B, sieve C, separator D, and mixing-tub H, when constructed and operated together substantially as and for the purposes set forth.

12. The combination of the dampener A, grinding-mill B, sieve C, separator D, mixing-tub H, and cooker E, when constructed and operated together substantially as and for the purposes set forth.

13. The combination of the dampener A, grinding-mill B, sieve C, separator D, mixing-tub H, cooker E, and secondary mill F, when constructed and operating together substantially as and for the purposes set forth.

14. The combination of the dampener A, grinding-mill B, sieve C, separator D, mixing-tub H, cooker E, secondary mill F, and converting or mash tub G, when constructed and operating together substantially as and for the purposes set forth.

15. The combination of the dampener A, grinding-mill B, sieve C, separator D, mixing-tub H, secondary mill F, and mash-tub G, when constructed and operating together substantially as and for the purposes set forth.

16. The combination of the dampener A, grinding-mill B, sieve C, mixing-tub H, secondary mill F, and mash-tub G, when constructed and operated together substantially as and for the purposes set forth.

17. The combination of the dampener A, grinding-mill B, sieve C, separator D, cooker E, secondary mill F, and the mash-tub G, when constructed and operated together substantially as and for the purposes set forth.

18. The combination of the dampener A, grinding-mill B, sieve C, separator D, mixing-tub H, cooker E, secondary mill F, and mash-tub, when constructed and operating together substantially as and for the purposes specified.

In witness whereof I have hereunto set my hand this 17th day of February, 1882.

JAMES DUFF.

Witnesses:
C. W. SMITH,
J. A. NOTTINGHAM.